United States Patent
Fuchs et al.

(10) Patent No.: US 7,652,255 B2
(45) Date of Patent: Jan. 26, 2010

(54) RADIATION CONVERTER AND METHOD FOR PRODUCTION THEREOF

(75) Inventors: Manfred Fuchs, Nürnberg (DE); Martina Hausen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/996,796

(22) PCT Filed: Jul. 12, 2006

(86) PCT No.: PCT/EP2006/064142

§ 371 (c)(1),
(2), (4) Date: May 21, 2008

(87) PCT Pub. No.: WO2007/012564

PCT Pub. Date: Feb. 1, 2007

(65) Prior Publication Data

US 2008/0224048 A1     Sep. 18, 2008

(30) Foreign Application Priority Data

Jul. 26, 2005   (DE) .................. 10 2005 034 915

(51) Int. Cl.
*G01T 1/20* (2006.01)
(52) U.S. Cl. .................. 250/361 R
(58) Field of Classification Search .......... 250/361 R
See application file for complete search history.

(56) References Cited

U.S. PATENT DOCUMENTS 6,921,909 B2 * 7/2005 Nagarkar et al. .......... 250/483.1
7,315,027 B2 * 1/2008 Okada et al. ........... 250/370.11

OTHER PUBLICATIONS

Trefilova et al: "Role of sodium in radiation defect formation in CsI crystals" Radiation Measurements, Elsevier, Amsterdam, NL, vol. 33, No. 5, Oct. 2001, pp. 687-692.*

* cited by examiner

*Primary Examiner*—David P Porta
*Assistant Examiner*—Mindy Vu
(74) *Attorney, Agent, or Firm*—Schiff Hardin LLP

(57) ABSTRACT

A radiation converter has a luminophore layer formed by needle-shaped crystals applied on a substrate, the crystals being composed of CsI. doped with Tl. The emission spectrum is modified to obtain smaller values by making the Tl content between 200 ppm and 2,000 ppm.

9 Claims, 2 Drawing Sheets

RADIATION CONVERTER AND METHOD FOR PRODUCTION THEREOF

BACKGROUND OF THE INVENTION

1. Field of the Invention

The present invention concerns a radiation converter (transducer) of the type having a luminophore layer formed from needle-shaped crystals applied on a substrate, wherein the crystals are composed of CsI doped with Tl.

2. Description of the Prior Art

Radiation converters are used in imaging medical technology diagnostics. They are in particular used in x-ray image intensifiers, x-ray detectors, and as intensifier foils in x-ray film exposures, in storage luminophore image systems and in cameras. In such radiation converters, high-energy radiation is absorbed and converted into light in a scintillator or luminophore layer. This light is detected by means of photodiodes or CCDs and is evaluated by downstream electronics.

Insofar as alkali halogenides (for example CsI:Tl) are used to produce the luminophore layer, an emission maximum of the generated light according to the prior art typically lies in the range from 540 nm to 560 nm. Contrary to this, a maximum sensitivity of photodiodes and CCDs lies in the range from 500 nm to 520 nm. This leads to a loss of light yield which must be compensated by an undesirable increase of the radiation dose.

SUMMARY OF THE INVENTION

An object of the present invention is to avoid the disadvantages according to the prior art in a radiation converter that enables an improved light yield in combination with conventional light-sensitive sensors. A further goal of the invention is to provide a method for production of such a radiation converter.

The above object is achieved in accordance with the invention by a radiation converter (transducer) of the above type wherein the content of thallium is in the range from 200 ppm to 2000 ppm. Surprisingly, a shift of the emission maximum to smaller values has resulted given the use of such a low content of thallium. An improved light yield can be achieved with the inventive radiation converter in combination with conventional light-sensitive sensors.

The CsI advantageously has an alkali metal as a co-dopant. The alkali metal can be selected from the following group: K, Na, Rb. It has proven to be particularly advantageous for the alkali metal to be incorporated in a quantity of 0.1% by weight to 10.0% by weight. The co-doping causes a further shift of the emission maximum of the luminophore layer toward lower values.

A concentration of Tl in the needle-shaped crystals along a z-axis of the crystals running essentially perpendicular to the substrate surface appropriately does not deviate by more than 50% relative to an average concentration of Tl. It has been shown that a shift of the emission maximum toward lower values is promoted by an optimally homogeneous distribution of Tl in the CsI lattice.

In the inventive radiation converter, the emission maximum of the luminophore layer lies in the range from 500 nm to 520 nm. By variation of the aforementioned parameters the emission maximum can naturally be adapted to a sensitivity maximum of the respectively used light-sensitive sensor.

In an inventive method for manufacture of the inventive radiation converter, the quantity of TlI is measured such that the content of thallium in the deposited luminophore layer lies in the range of 200 ppm to 2000 ppm. The particular quantity of TlI to be used depends on the selected vapor deposition conditions.

Departing from the prior art, it has proven to be particularly advantageous to simultaneously vaporize CsI, TlI and possibly the co-dopant and to deposit them from the vapor phase onto the substrate. A particularly highly homogeneous distribution of thallium in a CsI lattice thus can be achieved and, as a consequence, surprisingly a shift of the emission maximum to smaller values occurs. CsI and TlI can be provided in two separate sources in the vaporization device for simultaneous vaporization, but it is also possible for the two substances to exist in a mixture and be vaporized from a single source.

In a similar manner, the alkali halogenide (provided as a co-dopant) can either be vaporized from a separate source. It is also possible for the alkali halogenide to exist in a mixture with CsI and/or TlI and be vaporized from a single source.

The aforementioned embodiments of the luminophore layer are also applicable to the method.

DESCRIPTION OF THE PREFERRED EMBODIMENTS

Figure 1:
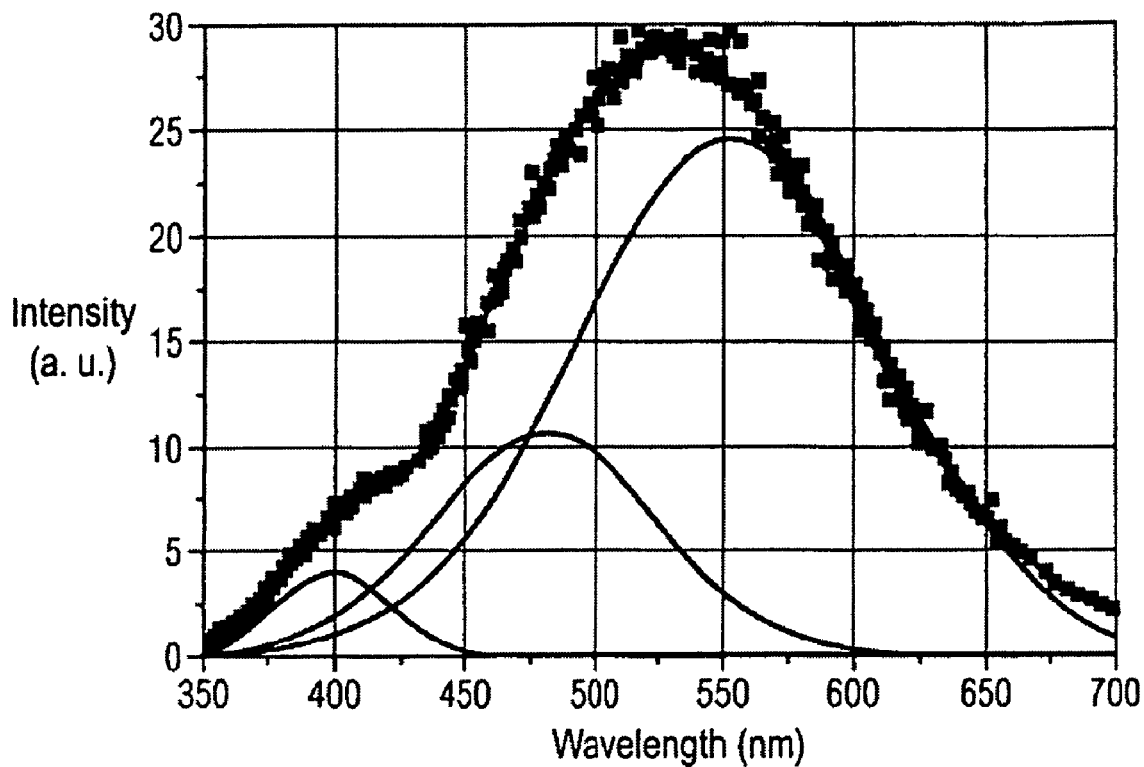
FIG. 1 shows an emission spectrum of a first CsI layer doped with thallium.

FIG. 1 shows an emission spectrum of a CsI layer doped with thallium. The production of the CsI:Tl layer ensues in a conventional manner by vacuum deposition, but with the difference that the CsI and the TlI are vaporized simultaneously. In the produced layer the content of Tl is approximately 1500 ppm on average. The Tl has been particularly homogeneously incorporated into the needle-shaped CsI crystals. In a z-axis of the crystals which is essentially perpendicular to a substrate surface, the content of Tl amounts to less than 50% relative to the average concentration of Tl.

As is apparent from FIG. 1, the emission maximum of a layer produced in such a manner lies approximately in the range of 530 nm.

The emission spectrum has been analyzed with conventional methods. As is apparent from FIG. 1, the emission spectrum exhibits three individual peaks whose maximum are at 400 nm, 480 nm and 560 nm, respectively.

Figure 2:
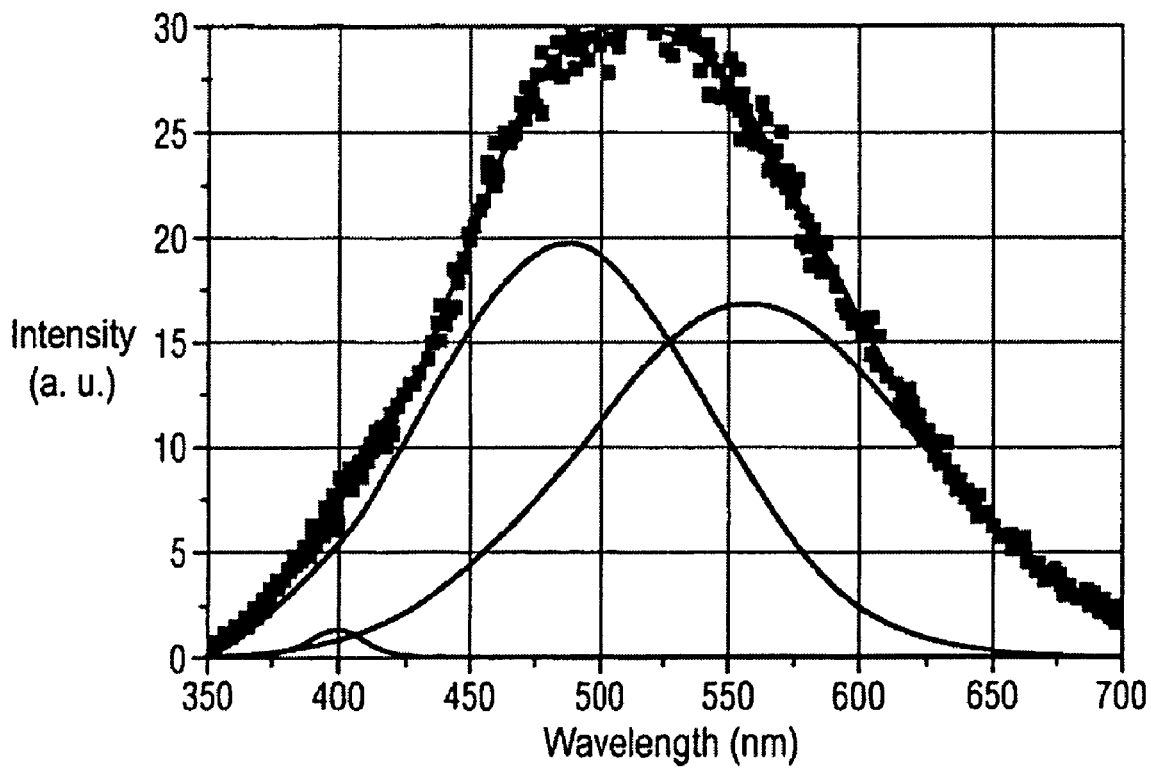
FIG. 2 shows an emission spectrum of a second CsI layer doped with thallium and potassium.

FIG. 2 shows the emission spectrum of a second CsI layer which has been doped with the same content of thallium as the layer shown in FIG. 1. In contrast to the layer shown in FIG. 1, here KI has been used as a co-dopant in the production of the layer, and in fact in a quantity such that potassium has been incorporated into the produced crystals in a content of 0.5% by weight.

As is apparent from FIG. 2, the addition of an alkali metal as a co-dopant, in particular of potassium, has made the peak in the range of 480 nm higher and the peak with maximum at 560 nm smaller. Overall a shift of the emission maximum to a value in the range of 500 nm therewith results.

Insofar as the co-doping of alkali exceeds values by 0.5% by weight, it has proven to be advantageous to additionally temper the produced layers for approximately 40 to 80 minutes at a temperature of 200° C. to 300° C. in air, inert gas or vacuum. With this measure it is achieved to lower the peak with maximum at 560 nm and therewith to shift the emission maximum towards smaller values.

Figure 3:
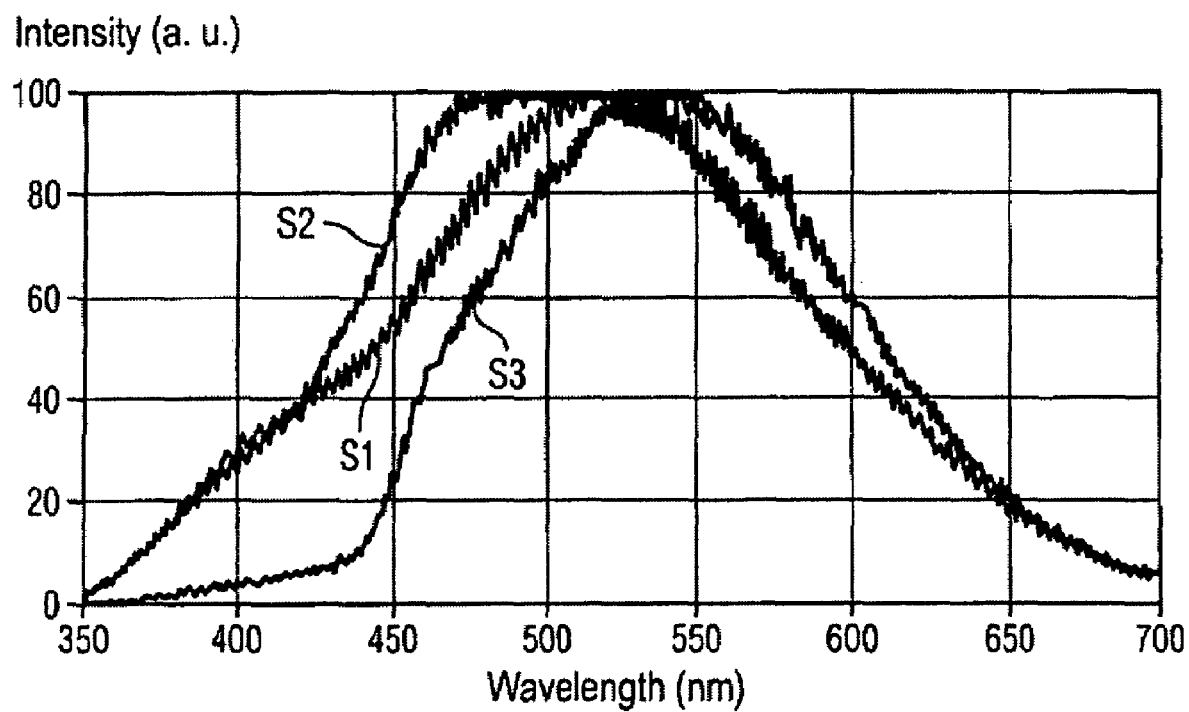
FIG. 3 shows the emission spectrum of FIG. 1 and FIG. 2 in comparison to a third CsI:Tl layer according to the prior art.

FIG. 3 again shows in comparison the emission spectrum of the first layer shown in FIG. 1, the second layer shown in FIG. 2 and a third layer according to the prior art. As is clearly apparent from FIG. 3, the second layer doped with thallium and potassium shows an emission maximum in the range of 500 nm, particularly suitable for a combination with conventional light-sensitive sensors.

Although modifications and changes may be suggested by those skilled in the art, it is the intention of the inventors to embody within the patent warranted heron all changes and modifications as reasonably and properly come within the scope of their contribution to the art.

We claim as our invention:

1. A radiation converter comprising:
   a substrate;
   a luminophore formed by needle-shaped crystals applied on said substrate;
   said needle-shaped crystals comprising CsI doped with Tl having a Tl content in a range from 200 ppm to 2,000 ppm; and
   an alkali metal as a co-dopant with Tl, said alkali metal comprising between 0.1% by weight and 10.0% by weight of said luminophore layer.

2. A radiation converter as claimed in claim 1 wherein said alkali metal is selected from the group consisting of K, Na and Rb.

3. A radiation converter as claimed in claim 1 wherein said needle-shaped crystals exhibit an axis substantially perpendicular to a surface of the substrate, and wherein a concentration of Tl along said axis does not deviate by more than 50% relative to an average concentration of Tl.

4. A radiation converter as claimed in claim 1 wherein said luminophore layer has an emission maximum in a range between 500 nm to 520 nm.

5. A method for producing a radiation converter comprising:
   applying a luminophore layer on a substrate by deposition of CsI and Tl on the substrate from the vapor phase;
   selecting a quantity of Tl for deposition on said substrate that produces a thallium content in the deposited luminophore layer in a range from 200 ppm to 2,000 ppm;
   additionally vapor depositing an alkali halogenide as a co-dopant with Tl on said substrate; and
   selecting a quantity of said alkali halogenide for said vapor deposition that produces a content of alkali metal in the luminophore layer after deposition of said alkali halogenide thereon, in a range between 0.1% by weight and 10.0% by weight.

6. A method as claimed in claim 5 comprising selecting said alkali halogenide from the group consisting of potassium halogenide, sodium halogenide and rubidium halogenide.

7. A method as claimed in claim 5 comprising employing an alkali iodide as said alkali halogenide.

8. A method as claimed in claim 5 comprising simultaneously vaporizing CsI and Tl on said substrate from the vapor phase.

9. A method as claimed in claim 8 comprising simultaneously vaporizing said alkali halogenide on said substrate with the simultaneous vaporization of CsI and Tl on said substrate.

* * * * *